Aug. 19, 1958 S. KUCHINSKY 2,848,605
ANALOGUE-TO-DIGITAL CONVERSION USING CATHODE RAY
SAMPLER TO CONTROL CATHODE RAY CODER
Filed Jan. 22, 1954 4 Sheets-Sheet 1

INVENTOR
SAUL KUCHINSKY
BY
Earl D. Ayers
AGENT

INVENTOR
SAUL KUCHINSKY
BY
Earl D. Ayers
AGENT

INVENTOR
SAUL KUCHINSKY
BY
Earl D. Ayers
AGENT

INVENTOR
SAUL KUCHINSKY
BY
Earl D. Ayers
AGENT

United States Patent Office 2,848,605

Patented Aug. 19, 1958

2,848,605

ANALOGUE-TO-DIGITAL CONVERSION USING CATHODE RAY SAMPLER TO CONTROL CATHODE RAY CODER

Saul Kuchinsky, Phoenixville, Pa., assignor to Burroughs Corporation, Detroit, Mich., a corporation of Michigan Application January 22, 1954, Serial No. 405,613

4 Claims. (Cl. 250—27)

This application is a continuation-in-part of my earlier filed application Serial No. 304,344, filed August 14, 1952, now Patent No. 2,733,409 granted January 31, 1956.

This invention relates generally to methods of monitoring instantaneous values of varying signals and particularly it relates to means of sampling varying electric signals and translating said samples at predetermined intervals of time into discrete potential levels or other means indicating the values of said samples.

Various methods of examining instantaneous values of a varying signal at predetermined intervals of time and translating these instantaneous signal levels into individual codes or other output signals representative of the magnitude of the signal amplitude are known in the prior art. Modifications of such systems have been identified as pulse code modulation, pulse density modulation, pulse time modulation, pulse length modulation, and analog to digital conversion, among others. It is to be understood that the term "pulse code modulation" as used in the instant case is meant to include these other similar systems listed above.

Present pulse code modulation systems and analog to digital conversion systems utilizing electronic means have been characterized by complexity of circuitry and equipment required, high cost to obtain reliability of operation, and bulkiness which limits the mobility of the equipment and its use in many applications where space for bulky equipment is not available.

For example, in most prior art pulse code modulation systems, in order to achieve required accuracy and deflection stability where a cathode ray tube is used as the pulse sampling means, a regulated power supply and means for feeding back a portion of the output of the tube to the input thereof is necessary. The feedback networks required are in most cases somewhat complex, and in any event their proper operation requires critical adjustment. Further pre-sampling of the input signal is required to facilitate quantizing. Also, if the system is to operate on sampling pulses of short duration, say of the order of a fraction of a microsecond, any networks or other external circuitry associated with the sampling means should be minimized because of its adverse effect on the sampling action.

Another difficulty with many prior art pulse code modulation systems is that the duration of the output signal is similar to the duration of the sampling pulse, and when very short sampling pulses are used, the usable output of the system is less than desired for use with the equipment with which the system is associated.

A principal object of this invention is to provide an improved pulse code modulation system.

Another object of this invention is to provide an improved pulse code modulation system having simplicity of structure.

An additional object of this invention is to provide an improved, more compact pulse code modulation system.

A further object of this invention is to provide a pulse code modulation system having improved reliability of operation.

Yet another object of the present invention is to provide an improved pulse code modulation system which is capable of reliable operation when sampling pulses of short duration are applied thereto.

An ancillary object of this invention is to provide a pulse code modulation system in which the duration of the output signal is substantially independent of the duration of the sampling pulse.

A still further object of the present invention is to provide an improved, inexpensive analog to digital conversion system having a high degree of reliability.

According to the present invention there is provided a pulse code modulation system comprising a selector tube having a plurality of individual output elements, means for forming and deflecting an electron beam whereby said electron beam impinges on selected ones of said output elements in response to variations of a signal which is sampled, a beam switching tube comprising a thermionic cathode, a hollow circular array of beam forming and directing electrodes disposed around said thermionic cathode, magnetic field means having lines of force in said switching tube extending substantially parallel to said thermionic cathode. Each of said beam forming and directing electrodes of the beam switching tube is directly coupled to one of said individual output elements of the selector tube. A separate impedance including a resistive element is connected between each of said beam forming and directing electrodes and a source of potential which is positive with respect to said thermionic cathode for lowering the potential of the beam forming and directing electrodes which are coupled to the output electrodes of said selector tube on which said electron beam impinges, and means are provided for obtaining output signals from said beam switching tube.

The invention as well as additional objects and advantages thereof will be best understood from the following description when read in connection with the accompanying drawings, in which.

Figure 1:
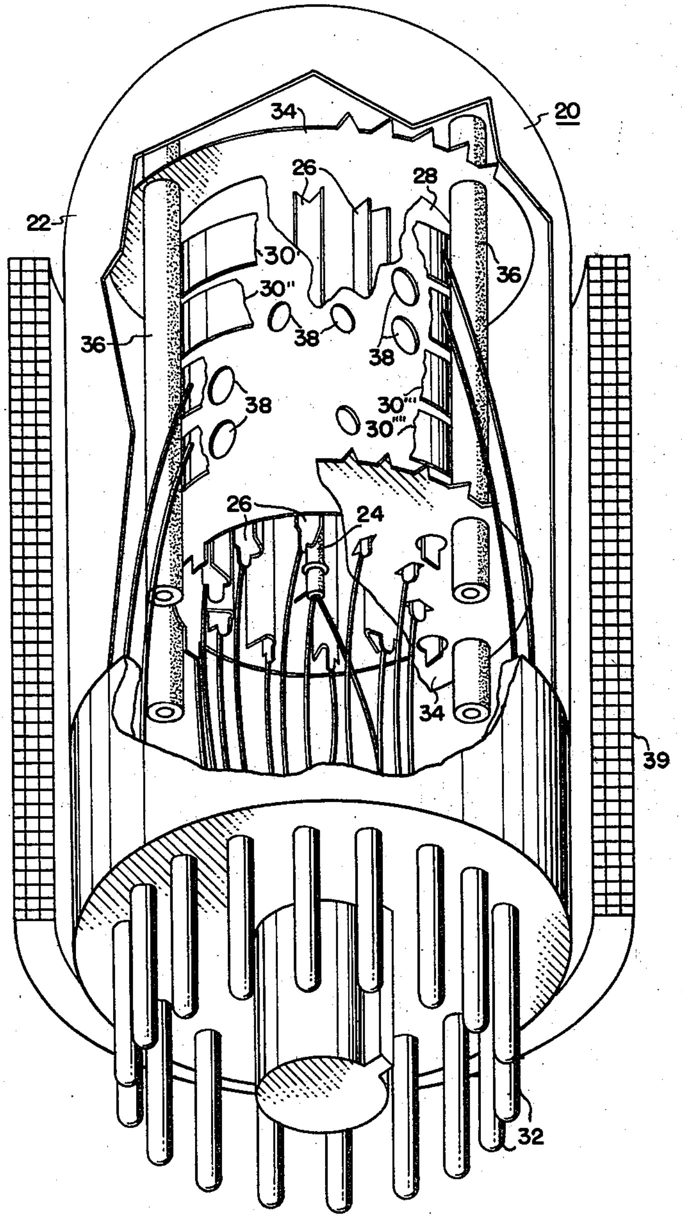
Fig. 1 is an isometric view, partly broken away in section, of a beam switching tube having electrodes arranged to provide a coded output signal and which may be utilized in the present invention.

Referring to Fig. 1, the tube 20 comprises, within a hermetically sealed envelope 22, a centrally disposed elongated cathode 24 which is illustrated as being of the indirectly heated oxide coated type but which may be of other types, an array of elongated trough shaped beam forming and directing electrodes 26, known as spades or spade electrodes, an apertured sleeve-like anode 28 of greater diameter than the array of spade electrodes 26, and an outer array of stacked output electrodes 30. Leads to the cathode heater, cathode 24, each of the spades 26, anode 28 and each of the output electrodes 30 are brought out through the tube envelope 22 to the base pins 32. The mount assembly of the tube is supported and maintained in position by top and bottom mica spacers 34, insulating support rods 36 and other supporting structure which, for the sake of clarity in the drawing, are not shown. A magnet 39, shown as being external to the tube, but which could be included in the tube envelope if desired, provides a constant magnetic field having lines of force extending into the tube envelope and which are substantially parallel to the elongated cathode 24. In order to avoid distortion of the magnetic field within the tube, the various electrodes may be made of non-magnetic materials.

Briefly, the operation of the tube 20 is as follows. The spades 26 (each of which is insulated from the others), anode 28 and output electrodes 30 are all operated under "no signal" conditions at potentials which are positive with respect to the cathode 22, substantially the same potential being on each of the spade electrodes 26. Because the spade electrodes 26 are physically closer to the cathode 24 than are the other electrodes, a change in potential on the spade electrodes 26 has a greater effect on the attraction of electrons emanating from the cathode 24 than does a similar change in potential on the other electrodes. In fact, because the anode 28 provides electrostatic shielding between the output electrodes and the inner portion of the tube 20, a change in potential on the output electrodes 30 has relatively little effect on the electrons emanating from the cathode regardless of the amplitude of the said change in potential.

The magnetic field within the tube and the electrostatic field existing between the cathode 22 and principally the spades 26 and anode 28 are so related that under "no signal" conditions substantially no electrons reach either the spade electrodes 26 or the anode electrode 28. That is, under the "no signal" condition, the electrons emitted from the cathode 22 tend to follow a curved or spiral path without impinging on the outer electrodes, as is the case in a conventional magnetron tube under cutoff conditions. If the relation between the electrostatic field and the magnetic field be altered in suitable manner, by causing one of the spade electrodes to have a potential near cathode potential, a beam of electrons is formed between the cathode and the spade having the lowered potential. In some beam switching tubes the current in the spade circuit is utilized as the output current of the tube, but this is not done in the tube illustrated in Fig. 1. Further, the field existing between the spade 26 having the lowered potential and the anode 28 attracts a part of the electron beam to the anode 28. In many cases only a minor part of the beam impinges on the spade.

As previously mentioned, the anode 28 is provided with apertures 38 which are radially aligned with the space between adjacent spades. In the particular tube illustrated in Fig. 1, there are ten spades and four output electrodes, and the number of anode apertures aligned with the space between any two adjacent spades may vary between none and four, depending on the beam position "number" designation or coding which is desired. The four output electrodes surround the anode 28 in such a manner that electrons passing through any one of the apertures in the anode 28 impinge on one of the four output electrodes. Assuming that a binary coded output is desired, one output electrode may be said to represent $2^0$ or 1, another represents $2^1$ or 2, another $2^2$ or 4, and the last output electrode represents $2^3$ or 8. It can be appreciated that such a four output electrode arrangement would suffice to give coded output signals for a tube having 16 beam positions. For example, no output on any output electrode (because there were no anode apertures at that beam position) would indicate the numeral zero, electrons impinging on the $2^0$ and $2^2$ output electrodes would indicate the coded numeral 5 (by combining 1+4), and so on.

Thus, it can be seen that to convert from an uncoded digital input (1 to 10 beam positions in the tube, for example) to a coded output, the spade 26 corresponding to the input number is lowered to near to the cathode potential, causing a beam or stream of electrons to be formed between the cathode and that beam position, with electrons from the beam passing through the suitably coded anode apertures at that position and impinging on the output electrodes to provide the coded output.

Figure 2:
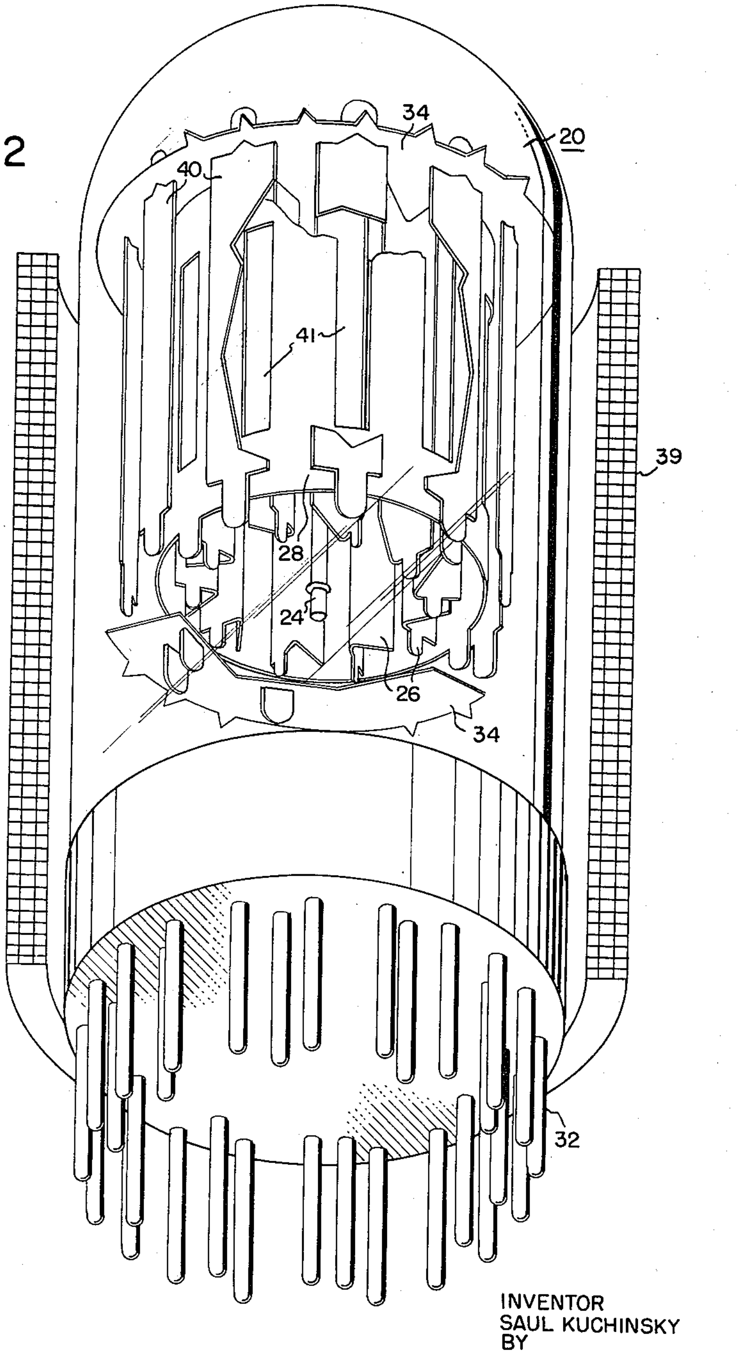
Fig. 2 is an isometric view, partly broken away in section, of a beam switching tube having an output electrode arrangement suitable for providing digital output signals and which may be utilized in the present invention.

The tube of Fig. 2 is similar to that shown in Fig. 1 except that a different output electrode arrangement is provided. In this tube an individual output electrode 40 is provided for each beam position of the tube, rather than the coded output arrangement of the tube in Fig. 1. Further, slots 41 in the anode 28 are provided at each beam position rather than the apertures 38 as in the tube in Fig. 1. The advantages of each type of beam switching tube in pulse code modulation systems will be explained in connection with the respective systems. Detailed descriptions of the tubes shown in Figs. 1 and 2 and the operation thereof will be found in Saul Kuckinsky's copending application Serial No. 370,137, filed July 24, 1953.

Figure 3:
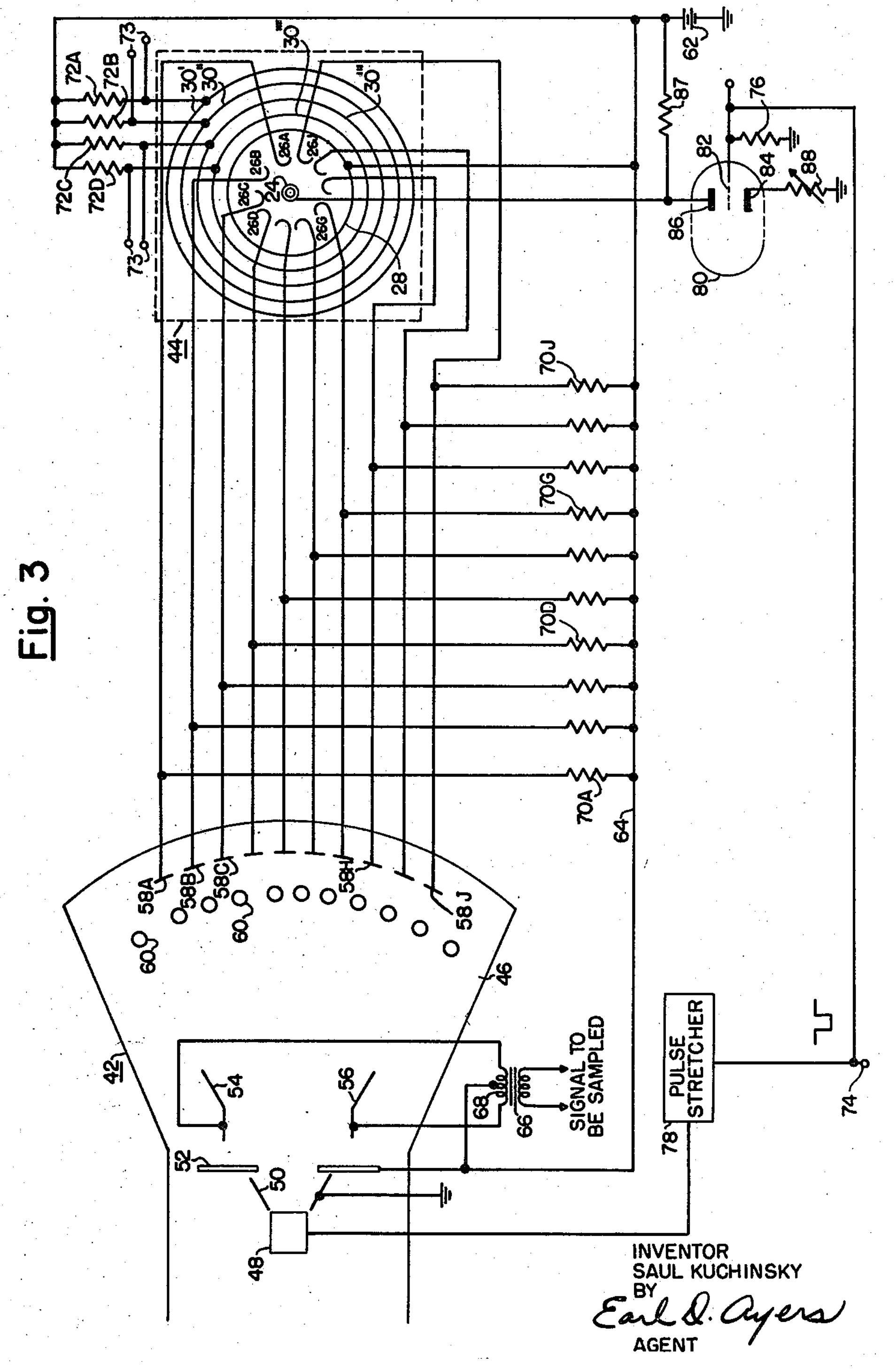
Fig. 3 is a schematic diagram of a system embodying the present invention and in which the tube shown in Fig. 1 may be utilized.

Referring now to Fig. 3, there is shown a pulse code modulation system which includes a selector or sampling tube 42 and a beam switching tube 44 (shown schematically within the dotted lines) which may be of the type shown in Fig. 1. The sampling tube 42 is illustrated as being a cathode ray tube, although it is recognized that other type tubes having means for providing a plurality of arbitrarily selectable output signals could be used. Further, the tube 42 is illustrated as being of the electrostatic deflection type of cathode ray tube, but other deflection means, such as magnetic deflection or a combination of electrostatic and magnetic deflection may also be utilized, if desired. The selector or sampling tube 42 includes an hermetically sealed envelope 46, a cathode 48, focussing electrode 50, accelerating electrode 52, deflection electrodes 54, 56, a plurality of similar output electrodes **58*a*–58*j* (since there are ten output electrodes in the tube 42 in Fig. 3), and suppressor electrodes 60, one of the suppressor electrodes being located adjacent each of the output electrodes 58 but spaced from the targets in the direction of the cathode 48. The suppressor electrodes are normally connected together and conductively connected to the cathode, but this is not shown in the figure for the sake of simplicity. As illustrated in Fig. 3, the focussing electrode 50 of the tube 42 is operated at ground potential and the accelerating electrode 52 is connected to a source of positive potential, such as the battery 62, through the lead 64. The signal to be sampled is applied to the primary winding of the transformer 66. The secondary winding 68 of the transformer 66 is center tapped, and the center tap is connected to the accelerating electrode 52. Each end of the secondary winding 68 is connected to one of the deflecting electrodes 54, 56**.

The beam switching tube 44, shown schematically in Fig. 3, is similar to the tube in Fig. 1 and has ten beam forming and directing electrodes or spades **26*a*–26*j* arranged in a hollow cylindrical array around the cathode 24. The apertured anode 28 is represented by the inner circle, with the ring-like output electrodes being represented by the other four circles. For the sake of convenience each of the circles in the schematic representation of the tube 44** is denoted by the reference numeral of the corresponding part of the tube illustrated in Fig. 1.

Each of the output elements or electrodes **58*a*–58*j* of the selector tube 46 is directly connected to one of the spade electrodes 26*a*–26*j*. For example, output element 58*c* is connected to spade 26*c*, output element 58*h* is connected to spade 26*h*, and so on. A separate impedance 70*a*–70*j*, which in most cases comprises a resistor but which may comprise a resistor and another impedance element, is connected between each of the spades 26*a*–26*j* and a source of positive potential which may be the battery 62** which also supplies the accelerating potential of the selector tube. Often the stray capacity constitutes the "other" impedance element. Obviously, voltage divider means may be employed to reduce the positive potential of the spades in event the accelerating voltage of the selector tube is too high to serve as the spade potential for the beam switching tube.

The direct coupling between the selector tube output elements and the spades of the beam switching tube has important advantages in that very simple and economically produced circuitry suffices to couple the two tubes. Further, operation of the system at high speed and with sampling pulses of short duration is improved because of the simplified coupling means. Other types of coupling could be utilized in event the output impedance of the selector tube utilized is incompatible with the spade impedance of the beam switching tube.

The output of the beam switching tube is developed across the load resistors *72a–72d*, each of which is connected between one of the output electrodes (represented by the rings 30′, 30″, 30‴ and 30⁗) and a source of positive potential (such as the battery 62), and is taken from the terminals 73. As mentioned previously, the output of this type of beam switching tube is in coded form. Similar tubes having output signals in other than the binary code form illustrated can of course be made.

Thus far the description of the pulse code modulation system of Fig. 3 has been primarily concerned with the selector or sampling tube 42, the beam switching tube 44, and the coupling between the two tubes.

The means for applying the sampling pulse or pulses to the pulse code modulation system will now be considered. The input pulses are negative in polarity and are applied between the input terminal 74 and ground across input resistor 76, which is also the grid resistor for the tube 80, from whence they are applied to both the sampling tube 42 and the beam switching tube 44, through a pulse stretcher 78 in the case of the sampling tube and through a clearing tube 80 in the case of the beam switching tube 44. The pulse stretcher 78 may, in its simplest form, be a resistor with a capacitor shunted across it for the purpose of decreasing the slope of the leading edge of the input pulse and increasing the slope of the lagging edge in such a manner that the input pulse is effectively lengthened The "lengthened" input pulse is applied to cathode 48 of the selector tube 42, biasing it negative with respect to the grounded focussing electrode 50 and thus "turning on" the electron beam for the duration of the lengthened input pulse. The input signal which is to be sampled is, as mentioned before, applied to the deflecting electrodes 54, 56. The electron beam, while it is turned on by the sampling pulse applied to the cathode 48, will therefore be directed to one of the output elements 58 in accordance with the deflection of the beam. The particular output element on which the beam impinges is dependent on the amplitude of the signal applied to the deflection circuit at the time of sampling. It should be mentioned that the deflection potential applied to the electrodes 54, 56 may be either of continuous or discontinuous form.

The sampling pulse, as mentioned above, is also applied to the tube 80 which is connected in series with the cathode circuit of the beam switching tube 44. The sampling pulse is applied to a control electrode 82 of the tube 80, which in its illustrated form is a triode tube having a control grid 82, cathode 84, and anode 86. A cathode resistor 88 is connected between the cathode 84 and ground. This resistor 88 is shown as being variable, but, for set operating conditions, a fixed resistor would suffice. The characteristics of tube 80 determine the ohmic value of resistor 88. With some tubes, cathode 84 can be grounded and resistor 88 could be eliminated. The value of the cathode resistor 88 is chosen to provide sufficient electron flow through the tube 80 (when no sampling pulse is applied to the control grid 82) to maintain the anode 86 at a relatively low potential with respect to the positive pole of battery 62 which supplies the spade 26 and anode 28 potentials. The anode 86 of the tube 80 is directly connected to the cathode 24 of the beam switching tube 44, and to the battery source of potential 62 through the resistor 87. When no sampling pulse is applied to the grid 82, the anode potential and consequently the potential on the cathode 24 is maintained at the required value with respect to the potential of the spades, anode and target of the beam switching tube for the "on" condition which is necessary if an electron beam is to be formed between the cathode 24 and one of the spades 26.

When a sampling pulse, which, as previously mentioned, is negative, is applied to the grid 82, electron flow through the tube 80 is cut off and consequently the potential on the anode 86 (and cathode 24) rises to or near to the potential of the positive pole of battery 62, extinguishing the electron beam of beam switching tube 44 thus clearing the tube and preparing it for the reception of a new input signal and the formation of the electron beam at a position in accordance therewith.

As previously mentioned, the proper operation of the beam switching tube depends on the proper relationship between the electrostatic field between the cathode 24 and the outer electrodes and the magnetic field which permeates the tube. When the electron flow in the tube 80 is cut off, the potential difference between cathode 24 and the array of spades 26 is changed, preventing any electron flow to the outer electrodes such as the spades 26, anode 28 or output electrodes 30′–30⁗ inclusive. That is, the electrons emitted from the cathode 24 travel in curved paths around the cathode 24 and never reach any positive electrode as is also the case in the magnetron cutoff condition.

The raising of the cathode potential due to cutting off of electron flow in the tube 80 is only momentary, however, since the tube 80 is cut off only for the duration of the sampling pulse and only for sufficient time to allow the RC circuit of the previous locked in spade to discharge.

The cutting off of the beam in the beam switching tube 44 may be accomplished in other ways, such as, for example, by dropping the potential on all the spades to near the cathode potential. This could be accomplished by inserting a gating or clearing tube in series with the positive potential supply and the spades. The important consideration is that a means be provided for controlling, in the proper manner, the relation between the magnetic and electrostatic fields required for operation of the tube 44 as a beam switching tube. Thus, it is apparent that a change in the magnetic field, as well as a change in the electrostatic field, could be utilized to accomplish the purpose of clearing the tube 44.

Clearing the beam switching tube before moving the beam from one position to another is desirable. First, lowering of the potential on another spade in the tube may or may not cause the beam to advance. Assuming that the beam positions are numbered from 1 to 10, and that the beam rotates in the direction which sweeps the beam through the number sequence in correct order, let us assume that the potential on spade number 3 is at or near to the potential of the cathode, that is, the beam forming and holding potential of the beam switching tube. Under this condition an electron beam will be formed between the cathode and the "3" position. If, however, the next spade to have its potential lowered is the "9" spade, for example, the beam may not be able to "look ahead" that far and so will not advance to the "9" position. Also, the case where the first sampled value is 3 and the second sampled value is 1, for example, must be considered. Although the beam positions are close together physically, it must be remembered that the direction of rotation of the beam is determined by the polarity of the magnetic field. Thus, the "1" position is farther from the "3" position (electronically speaking) than is the "9" position previously mentioned. However, if 3 has not discharged, it is possible that a separate beam would be formed between the cathode and the "9" position, and this would lead to spurious output signals (in both the "3" and "9" positions) which would not be indicative of the correct sampling value. So, in order to insure that the output signal of the beam switching tube 44 is a correct indication of the instantaneous value of the sampled signal, the beam is first cut off and then reformed during each sampling period.

It should be emphasized that the cutting off of the beam in the beam switching tube simultaneously with the application of the sampling pulse to the selector or sampling tube is for the purpose of achieving circuit simplicity while providing reliable operation. It is recognized that specific needs might require that the tube be cleared at other times. For example, if the sampling pulses are applied at irregular or widely spaced intervals and the output signal duration needs are such that the tube should provide an output signal of definite duration at each beam position, then delay lines or other means inserted between the input terminal 74 and the tube 80 may be used to extinguish the beam after a definite chosen time elapses. Further, although in Fig. 3 the sampling pulse is illustrated as being applied to the tube 80 directly from the input terminal 74, it is understood that intervening amplifying or shaping means could be inserted between the input terminal and the sampling tube and gating tube if required, without going beyond the scope of the present invention.

The overall operation of the pulse code modulation system shown in Fig. 3 is as follows: The sampling pulse is applied to terminal 74 from which it is then directly applied to the grid of the tube 80 and to the cathode of the selector tube 42 through the pulse stretcher 78. The application of the sampling pulse to the grid 82 of the tube 80 causes the tube to operate at cutoff, reducing the voltage drop across resistor 87 and raising the potential of the cathode 24 of the beam switching tube 44 and cutting off the electron beam which had been formed between the cathode 24 and the spade which had been at the lowered potential as a result of the previous sampling cycle. The beam switching tube 44 is then in condition to form a beam between the cathode 24 and another spade electrode 26.

The resistor 87 between the anode 86 of the tube 80 and the source of positive potential 62 may be deleted in many cases, as the cutting off of the tube 80 would still effectively break the cathode circuit and extinguish the beam of tube 44.

As mentioned before, the signal to be sampled is applied continuously to the deflection electrodes of the selector tube 42. Thus, when the sampling pulse which has passed through the pulse stretcher 78 is applied to the cathode 48, the electron beam of the sampling tube 42 is "turned on" and is deflected in proportion to the amplitude of the potential on the deflecting electrodes and impinges on one of the output elements 58 which represents the instantaneous value of the signal input. The impinging of the electron beam on one of the target or output elements 58 causes electron flow through the one of the impedance elements or resistors 70 which is common to that output element 58 on which the beam impinges and a corresponding spade 26 of the beam switching tube 44. The electron flow through the resistor 70 causes a potential drop across itself, thus lowering the potential on the spade 26 with which that resistor is associated. This new electric field condition causes an electron beam to be formed between the cathode 24 of the beam switching tube 44 and the spade having the lowered potential. Once the electron beam or stream is formed, current flows to the spade, and a sufficient part of the beam current impinges on the spade electrode to continue to cause the voltage drop across the resistor 70 to be great enough to hold the beam of the beam switching tube at the particular position even though the electron beam in the sampling tube 42 be extinguished. Thus an output is available from the beam switching tube whose duration is independent of the duration of the sampling pulse. Further, output of the beam switching tube is from one beam position only, for even though the beam in the selector tube 42 is broad enough (through being accidentally de-focussed, for example) or positioned exactly so as to impinge on two of the output elements of the selector tube 42, the beam in the beam switching tube 44 always goes to the leading spade having the lowered potential. This eliminates the annoying possibility of getting ambiguous outputs from the system in event of minor misadjustment of the selector tube, instead of one, and only one, output.

The insertion of the pulse stretcher 78 between the input terminal 74 and the cathode 48 of the selector tube insures that an output from the selector tube will be provided after the beam switching tube 44 has been cleared by the cutting off of the electron beam in that tube. As a practical matter, in the great majority of cases the pulse stretcher may be eliminated altogether, since a common pulse would result in the following two functions happening simultaneously: (A) the RC network composed of the spade load resistor and stray capacity of the old information spade discharges, raising its potential and electric field configuration to that of common spades and cutoff while (B) the RC network of the new spade position charges through the selector tube beam lowering its potential and establishing the electric field configuration necessary to form the electron beam of the beam switching tube in the new information position.

It should be emphasized that for special pulse sampling patterns, for example, where sampling is always done in such a manner that the beam in the beam switching tube advances in the direction of rotation thereof and advances for a limited number of beam positions each time the beam moves, cutting off the beam (clearing the tube) in the tube 44 between sampling cycles need not be done. This is due to the fact that the beam in the beam switching tube 44 apparently "sees ahead" for a limited distance and thus switches in a reliable manner, if the beam advance is not too great. How many positions ahead the beam "sees" varies with the tube and circuit parameters.

It is apparent that the system shown in Fig. 3, by virtue of the minimum amount of circuitry and the simplicity thereof, provides an economical, compact, reliable pulse code modulation system in which the output signals may be of long duration and in coded form.

Figure 4:
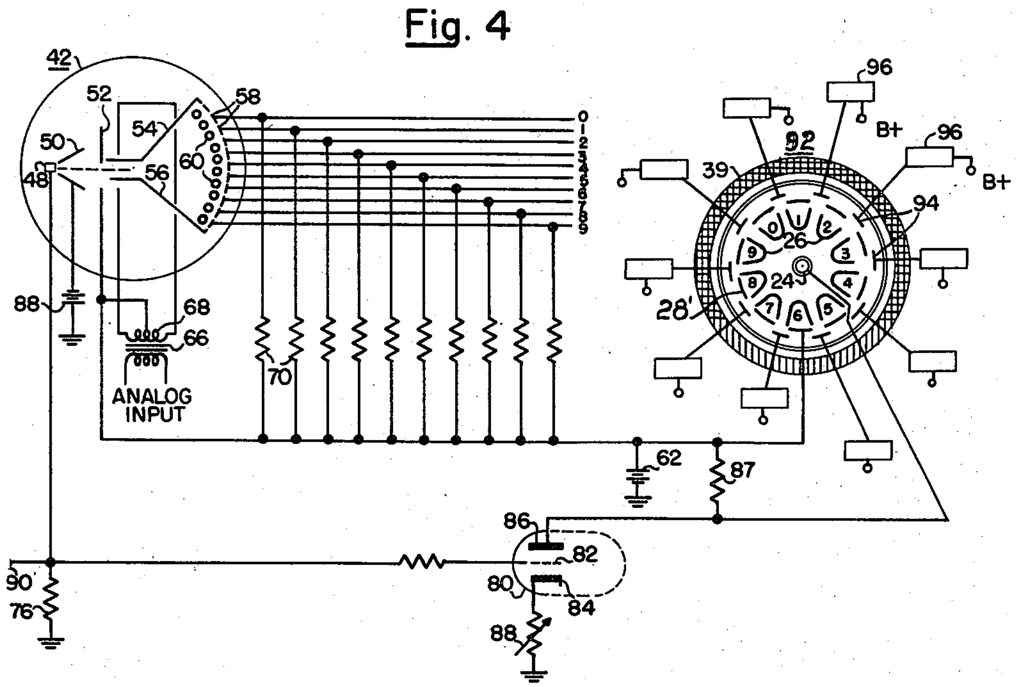
Fig. 4 shows a second embodiment of the present invention in which a tube of the type shown in Fig. 2 may be utilized.

Referring now to Fig. 4, there is shown a simplified pulse code modulation system in accordance with the present invention and in which the type of beam switching tube shown in Fig. 2 is utilized. The sampling or selector tube 42 is connected into the system in a manner similar to that shown in Fig. 3 except that the focussing electrode 50 is shown as being biased by a battery 88, which is connected between the focussing electrode 50 and ground, to cause the electron beam to be extinguished except when a negative sampling pulse is applied to the system through the input terminal 90. Further, the sampling pulse is applied directly to the cathode 48 without passing through an intervening pulse stretcher or other pulse shaping means. As in the system shown in Fig. 3, the output elements 58 of the sampling or selector tube 42 are indicated as being directly coupled to the spade or beam forming and directing electrodes 26 of the beam switching tube 92. The anode 28′ differs from the anode 28 of the tube shown in Fig. 1 in that it has a slotted portion at each beam position rather than a series of coding apertures. Further, in the beam switching tube shown in Fig. 2 and in Fig. 4, an individual output electrode 94 is provided at each beam position. This type of pulse code modulation system is especially well suited to analog to digital conversion. The analog input is applied to the deflection circuits of the selector tube 42 and the digital output is obtained from the individual output electrodes 94 of the beam switching tube across the individual output impedances 96.

Figure 5:
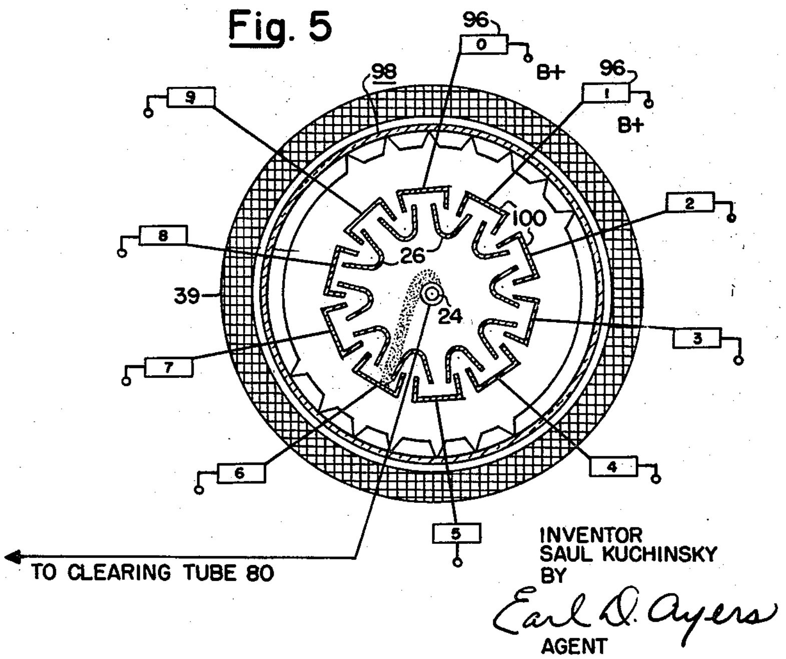
Fig. 5 is a plan view of a beam switching tube which may also be utilized in the system of Fig. 4.

The beam switching tube 92 shown in Fig. 4 may be replaced by one having the cross sectional configuration shown in Fig. 5. In the tube 98 of Fig. 5, there is no anode 28 or 28', and the individual output electrodes 100 are elongated and of somewhat U-shaped cross section, the ends of the U overlapping the adjacent ends of adjoining spades 26. The elimination of the anode 28 results in greater power output per tube, other parameters being equal, than in tubes having the anode 28. In tubes having the anode 28, some electrons impinge thereon rather than on the output electrodes, reducing the power output of the tube in proportion to the amount of electrons impinging on the anode 28. The particular configuration of the output electrodes of the tube shown in Fig. 5 is such that the output electrode is physically rather far removed from the central portion of the tube, and therefore relatively large changes in potential on the output electrodes have little adverse effect on the beam holding or switching characteristics of the tube. Further, the sides of the U serve to substantially reduce cross talk from one beam position to another. These and other advantages of this type tube, together with a detailed description of the tube and the operation thereof, is given in Saul Kuchinsky's copending application Serial No. 370,137, filed July 24, 1953.

Thus, for many applications, the isolating function of the anode 28 is not necessary. In any event, the additional power output outweighs the small disadvantages which appear when the anode 28 is not present. Obviously, when the tube 98 is used, there is no connection from the source of potential 62 to any anode, since no anode 28 is present in the tube.

Thus, it can be appreciated that the present invention provides improved pulse code modulation systems which have large useable output, are responsive to sampling pulses of very short duration and which utilize only a small number of parts other than the sampling and beam switching tubes. In addition, pulse code modulation systems made in accordance with this invention are characterized by compactness, light weight and reliability of operation.

While the beam switching tube will operate reliably over a large range of spade-cathode potential differences, in a typical system the spades are operated at 250 volts positive potential under the "no signal" conditions, previously mentioned, and the cathode is operated at 150 volts positive, both the spade and cathode potentials being with respect to ground. The spade impedances, in this system, were 100,000 ohm resistors, which values were sufficient to drop the spade potential to at or near the cathode potential with one milliampere of spade current flowing therethrough. The spade resistors may, of course, be included within the envelope of the beam switching tube. Tubes having this arrangement are described and claimed in the previously mentioned copending Kuchinsky application.

While the present invention is subject to obvious modifications by those skilled in the art, it is intended to cover all such modifications as come within the scope of the appended claims.

What is claimed is:

1. Pulse sampling apparatus comprising a selector tube including an electron gun for providing an electron beam, an array of individual output elements, said array of output elements being disposed in the path of said electron beam, means for deflecting said electron beam in response to variations of a signal to be sampled to cause said electron beam to impinge on selected ones of the output elements, a beam switching tube including an array of beam forming and directing electrodes, an electron emissive thermionic cathode disposed on one side of said array of electrodes, and a plurality of output electrodes equal in number to and disposed adjacent to but insulated from the electrodes of said array of beam forming and directing electrodes, respectively, and on the side thereof which is opposite to said cathode, each of said output elements of said selector tube being individually electrically coupled to a different one of said beam forming and directing electrodes, means including a separate impedance element connected between each of said beam forming and directing electrodes and a source of potential which is positive with respect to said cathode in order to lower the potential of the beam forming and directing electrode which is coupled to the output element of said selector tube upon which said electron beam impinges to thereby cause a stable electron flow between said thermionic cathode and the beam forming and directing electrode having said lowered potential, a portion of said flow being received by the associated switching tube output electrode, and means for momentarily extinguishing the electron beam in said beam switching tube while simultaneously sampling said signal in said selector tube.

2. In pulse sampling apparatus, a selector tube including a plurality of individual output elements, pulse responsive means for forming an electron beam in the selector tube, signal responsive means for deflecting the beam thus formed for impingement upon a selected one of said output elements at the time a pulse is received, means for applying a pulse to said pulse responsive means for forming an electron beam at spaced intervals of time, a beam switching tube including a thermionic cathode, a plurality of beam forming and directing electrodes disposed in spaced relation to the cathode, magnetic field means having lines of force in said beam switching tube extending substantially parallel to said cathode, a separate means electrically coupling each of said electrodes with a different one of said output elements of the selector tube, impedance means connected to each of said electrodes and operable to lower the potential of the electrode coupled to the output element of the selector tube upon which the electron beam impinges to thereby form an electron beam in the beam switching tube directed from the cathode toward the electrode having said lowered potential, an individual output electrode in the beam switching tube associated with each beam forming and directing electrode and operable to receive at least a portion of the electron beam directed theretoward and to provide an output signal, and means for momentarily extinguishing the electron beam in the beam switching tube in time relation to the application of pulses to said pulse responsive means of the selector tube.

3. In an analog to digital conversion system the combination of a selector tube having means for selectively energizing a plurality of output circuits connected thereto including means for forming an electron beam and means for positioning a formed beam to select and energize one of said circuits, means for applying a variable analog signal to said last means to position a formed beam in correspondence with the existing value of said signal, a switching tube having a central elongated emissive cathode, output electrodes therefor equal in number to said selector tube output circuits arranged in circumferentially spaced cylindrical array coaxial with said cathode and means for forming a stably positioned electron beam in part extending from said cathode to a selected one of said output electrodes including electrode means adjacent each of said output electrodes adapted upon suitable excitation thereof to cause a portion of the beam to be stably directed toward the associated output electrode, circuit means respectively connecting said selector tube output circuits with said switching tube beam directing electrode means for selective excitation of said latter means, output circuits respectively connected to said switching tube output electrodes for developing signals upon impingement of a portion of the switching tube beam on said electrodes, said signals being respectively representative of digital values assigned to the positions of said output electrodes according to the connections of their respectively associated beam directing electrode means to said selector tube output circuits, means normally inactivating said beam forming means of the selector tube, and means for periodically activating said last means over a selected analog signal sampling period to develop a signal in one of said switching tube output circuits, said signal thereby developed being, by virtue of the circuit in which it appears, representative of a digitalized value of said variable analog signal during said sampling period.

4. An electron tube switching and locking circuit comprising an electron beam switching tube having an elongated emissive cathode, beam control means including an array of circumferentially spaced beam forming and directing electrodes concentrically disposed around said cathode defining a like number of possible stable positions of an electron beam originating at said cathode, output electrode means at each of said positions for receiving at least a portion of the beam and thereby developing output signals respectively distinctive of the beam positions, means producing a magnetic field in the tube directed parallel to said cathode thereof, means holding a formed beam in the tube in stable locked-in condition at any one of said positions, means for applying a positive potential relative to said cathode to each of said beam forming and directing electrodes and means for modifying said potential to control the beam current in said switching tube including an electron discharge device having a cathode together with plate and grid electrodes, means for applying pulses to a grid electrode of said device and circuit means causing said applied potential to vary responsive to the resultant changes in the plate current of said device.

References Cited in the file of this patent

UNITED STATES PATENTS

| | | |
|---|---|---|
| 2,404,920 | Overbeck | July 30, 1946 |
| 2,424,289 | Snyder | July 22, 1947 |
| 2,560,166 | Glenn | July 10, 1951 |
| 2,564,908 | Kuchinsky | Aug. 21, 1951 |
| 2,591,997 | Backmark | Apr. 8, 1952 |